US012750943B2

(12) United States Patent
Ikeda et al.

(10) Patent No.: US 12,750,943 B2
(45) Date of Patent: Sep. 29, 2026

(54) RADIO FREQUENCY QUADRUPOLE LINEAR ACCELERATOR, NEUTRON SOURCE SYSTEM, AND RADIO FREQUENCY QUADRUPOLE LINEAR ACCELERATOR MANUFACTURING METHOD

(71) Applicant: RIKEN, Wakō (JP)

(72) Inventors: Shota Ikeda, Wakō (JP); Yasuo Wakabayashi, Wakō (JP); Kunihiro Fujita, Wakō (JP)

(73) Assignee: RIKEN, Wako (JP)

( * ) Notice: Subject to any disclaimer, the term of this patent is extended or adjusted under 35 U.S.C. 154(b) by 347 days.

(21) Appl. No.: 18/695,663

(22) PCT Filed: Sep. 6, 2022

(86) PCT No.: PCT/JP2022/033355
§ 371 (c)(1),
(2) Date: Mar. 26, 2024

(87) PCT Pub. No.: WO2023/053858
PCT Pub. Date: Apr. 6, 2023

(65) Prior Publication Data

US 2026/0143579 A1 May 21, 2026

(30) Foreign Application Priority Data

Sep. 30, 2021 (JP) ................................ 2021-160864

(51) Int. Cl.
*H05H 9/04* (2006.01)
*G21G 4/02* (2006.01)
*H05H 7/02* (2006.01)

(52) U.S. Cl.
CPC ............... *H05H 9/045* (2013.01); *G21G 4/02* (2013.01); *H05H 7/02* (2013.01); *H05H 2007/025* (2013.01)

(58) Field of Classification Search
CPC .... H05H 9/045; H05H 7/02; H05H 2007/025; G21G 4/02
See application file for complete search history.

(56) References Cited

U.S. PATENT DOCUMENTS 4,891,601 A 1/1990 Asari et al.
2002/0075094 A1* 6/2002 Bechtle .................... H01P 9/00 333/262

(Continued)

FOREIGN PATENT DOCUMENTS

JP 1-73800 U 5/1989
JP 1-96700 U 6/1989

(Continued)

OTHER PUBLICATIONS

International Search Report for International Application No. PCT/JP2022/033355, mailed Nov. 22, 2022, (5 pages).

(Continued)

*Primary Examiner* — Nicole M Ippolito
(74) *Attorney, Agent, or Firm* — ALSTON & BIRD LLP

(57) ABSTRACT

Maintainability is to be improved. A radio frequency quadrupole linear accelerator includes a tubular housing part having an outer peripheral surface at which two pairs of openings extending in an axial direction are formed facing each other, and a plurality of first vane electrodes inserted into the respective openings of the tubular housing part from outside toward an axial center, detachably attached to the openings, and disposed facing each other.

7 Claims, 6 Drawing Sheets

(56) References Cited

U.S. PATENT DOCUMENTS

| | | | | |
|---|---|---|---|---|
| 2004/0069958 | A1 * | 4/2004 | Dahl | G21K 5/04 250/398 |
| 2012/0200217 | A1 * | 8/2012 | Hayashizaki | H05H 9/045 228/112.1 |

FOREIGN PATENT DOCUMENTS

| | | | |
|---|---|---|---|
| JP | 6-290900 | A | 10/1994 |
| JP | 2011-86494 | A | 4/2011 |
| JP | 2011-86498 | A | 4/2011 |
| JP | 5317062 | B2 | 10/2013 |

OTHER PUBLICATIONS

Written Opinion of the International Searching Authority for International Application No. PCT/JP2022/033355, mailed Nov. 22, 2022, (6 pages).

* cited by examiner

RADIO FREQUENCY QUADRUPOLE LINEAR ACCELERATOR, NEUTRON SOURCE SYSTEM, AND RADIO FREQUENCY QUADRUPOLE LINEAR ACCELERATOR MANUFACTURING METHOD

TECHNICAL FIELD

The present invention relates to a radio frequency quadrupole linear accelerator, a neutron source system, and a radio frequency quadrupole linear accelerator manufacturing method.

BACKGROUND ART

A radio frequency quadrupole linear accelerator for accelerating charged particles such as ions or electrons is known (refer to Patent Literature 1, for example). The radio frequency quadrupole linear accelerator includes four electrodes and a tubular part. Each electrode is formed integrally with the tubular part.

CITATION LIST

Patent Literature

Patent Literature 1: Japanese Patent No. 5317062

SUMMARY OF INVENTION

Technical Problem

For example, when some electrodes are radioactivated or damaged, the electrodes are need to be replaced, but in the above-described radio frequency quadrupole linear accelerator, the electrodes and the tubular part are integrally shaped. Thus, the electrodes as well as the tubular part are simultaneously replaced, and furthermore, not only in the case of radioactivation and failure, but also, for example, in a case of acceleration energy adjustment, the electrodes as well as the tubular part need to be simultaneously adjusted, which lowers maintainability.

The present invention is made to solve the above-described problem and intended to mainly provide a radio frequency quadrupole linear accelerator, a neutron source system, and a radio frequency quadrupole linear accelerator manufacturing method with improved maintainability.

Solution to Problem

An aspect of the present invention for achieving the above-described intention is a radio frequency quadrupole linear accelerator including:

a tubular housing part having an outer peripheral surface at which two pairs of openings extending in an axial direction are formed facing each other; and a plurality of first vane electrodes inserted into the respective openings of the tubular housing part from outside toward an axial center, detachably attached to the openings, and disposed facing each other.

In the aspect, the tubular housing part may be constituted by coaxially coupling a plurality of tubular members each having an outer peripheral surface at which two pairs of openings extending in an axial direction are formed facing each other, and the first vane electrodes may be inserted into the respective openings of the tubular members from outside toward an axial center, detachably attached to the openings, and disposed facing each other.

In the aspect, the tubular members may be coaxially coupled to one another through a connection flange formed with a through-hole at a central part, two pairs of second vane electrodes facing each other may be detachably provided in the through-hole of the connection flange, and each of the second vane electrodes may be disposed between the first vane electrodes adjacent to each other and connect the first vane electrodes.

In the aspect, a front end plate formed with a through-hole at a central part may be detachably provided at a front end of the tubular housing part to block the front end, and a rear end plate formed with a through-hole at a central part may be detachably provided at a rear end of the tubular member to block the rear end.

An aspect of the present invention for achieving the above-described intention may be a neutron source system including:

an ion source configured to generate ions;

the above-described radio frequency quadrupole linear accelerator configured to accelerate the ions generated by the ion source; and a target station including a neutron production target material inside and configured to produce neutrons through nuclear reaction as the ions accelerated by the radio frequency quadrupole linear accelerator collide with the neutron production target material.

An aspect of the present invention for achieving the above-described intention may be a radio frequency quadrupole linear accelerator manufacturing method including:

a step of forming a tubular housing part having an outer peripheral surface at which two pairs of openings extending in an axial direction are formed facing each other; and a step of inserting first vane electrodes into the respective openings of the tubular housing part from outside toward an axial center, detachably attaching the first vane electrodes to the openings, and disposing the first vane electrodes such that the first vane electrodes face each other.

In the aspect, a plurality of tubular members each having an outer peripheral surface at which two pairs of openings extending in an axial direction are formed facing each other may be formed and coaxially coupled to constitute the tubular housing part, and the first vane electrodes may be inserted into the respective openings of the tubular members from outside toward an axial center, detachably attached to the openings, and disposed facing each other.

Advantageous Effects of Invention

According to the present invention, it is possible to provide a radio frequency quadrupole linear accelerator, a neutron source system, and a radio frequency quadrupole linear accelerator manufacturing method with improved maintainability.

DESCRIPTION OF EMBODIMENTS

First Embodiment

Figure 1:
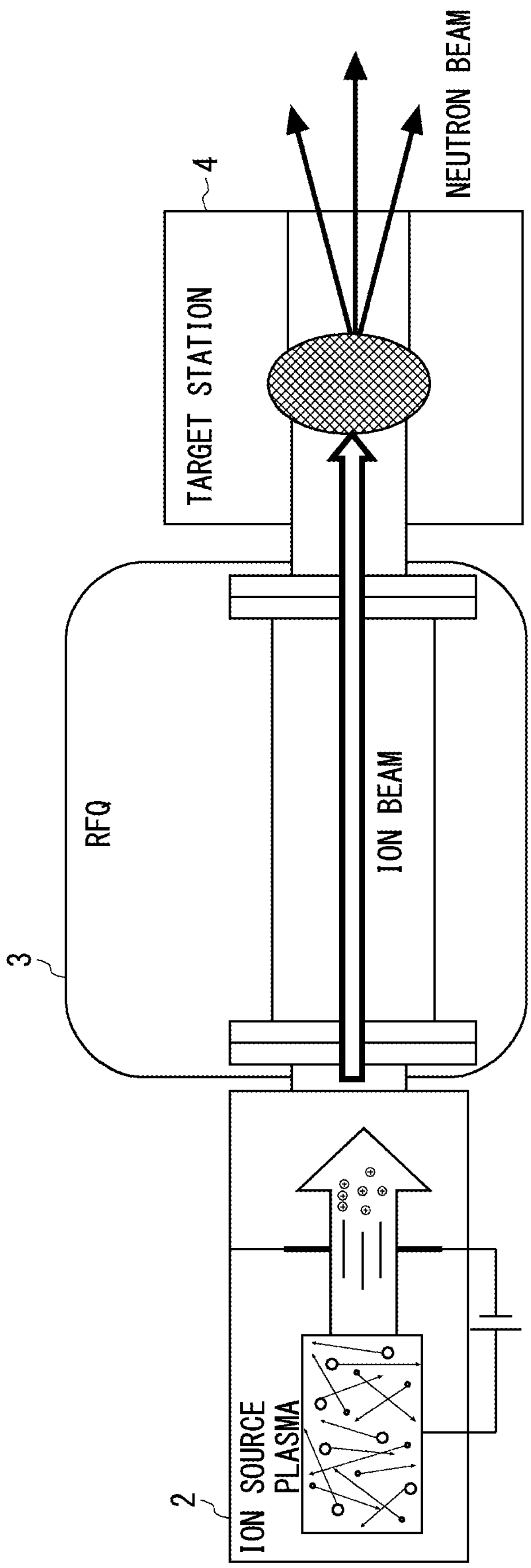
FIG. 1 is a block diagram illustrating a schematic configuration of a neutron source system according to the present embodiment.

Embodiments of the present invention will be described below with reference to the accompanying drawings. FIG. 1 is a block diagram illustrating, as an example, a schematic configuration of a small-sized neutron source system according to the present embodiment. As illustrated in FIG. 1, a radio frequency quadrupole (RFQ) linear accelerator 3 according to the present embodiment is configured as a particle accelerator used in a neutron source system 1. The neutron source system 1 according to the present embodiment includes an ion source 2, the radio frequency quadrupole linear accelerator 3, and a target station 4.

The ion source 2 is provided with, for example, a vacuum pump or a magnetron. The ion source 2 may be configured as a microwave ion source. For example, the ion source 2 generates plasma by ionizing a solid or gas and extracts ions by using an electric field, thereby generating ions (for example, protons $H^+$ of hydrogen ions).

The radio frequency quadrupole linear accelerator 3 is a linear accelerator of a radio frequency type. The radio frequency quadrupole linear accelerator 3 can simultaneously perform focusing and acceleration of an ion beam in a radio frequency electric field. The radio frequency quadrupole linear accelerator 3 is suitable for acceleration of a low energy ion beam right after the ion source 2.

The radio frequency quadrupole linear accelerator 3 applies radio frequency waves to four facing electrodes to generate a quadrupole electric field, thereby focusing and accelerating ions generated by the ion source 2. The radio frequency quadrupole linear accelerator 3 can accelerate ions, for example, up to 2.49 MeV. Note that a drift tube linac (DTL) that further focuses and accelerates ions may be provided at a later stage of the radio frequency quadrupole linear accelerator 3. The radio frequency quadrupole linear accelerator 3 may be used as an injector (prior-stage accelerator) such as a cyclotron or a synchrotron or may be used in a middle or large-sized neutron source system.

The target station 4 includes a neutron production target material such as lithium Li or beryllium Be inside. Note that, for example, lithium Li is preferably used as the neutron production target material in a case of low proton beam energy of 2.49 MeV approximately. Accordingly, a neutron production amount to be described later can be increased.

Ions accelerated by the radio frequency quadrupole linear accelerator 3 collide with the neutron production target material in the target station 4, and neutrons are produced through nuclear reaction. Then, the target station 4 emit the produced neutrons as a neutron beam. The neutron beam can be used to perform, for example, a non-destructive examination. Note that distance to the neutron production target material may be optionally set.

Figure 2:
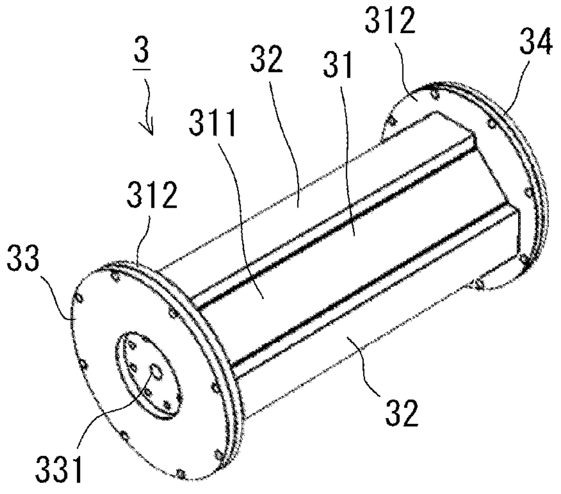
FIG. 2 is a perspective view illustrating the configuration of a radio frequency quadrupole linear accelerator according to the present embodiment.
Figure 3:
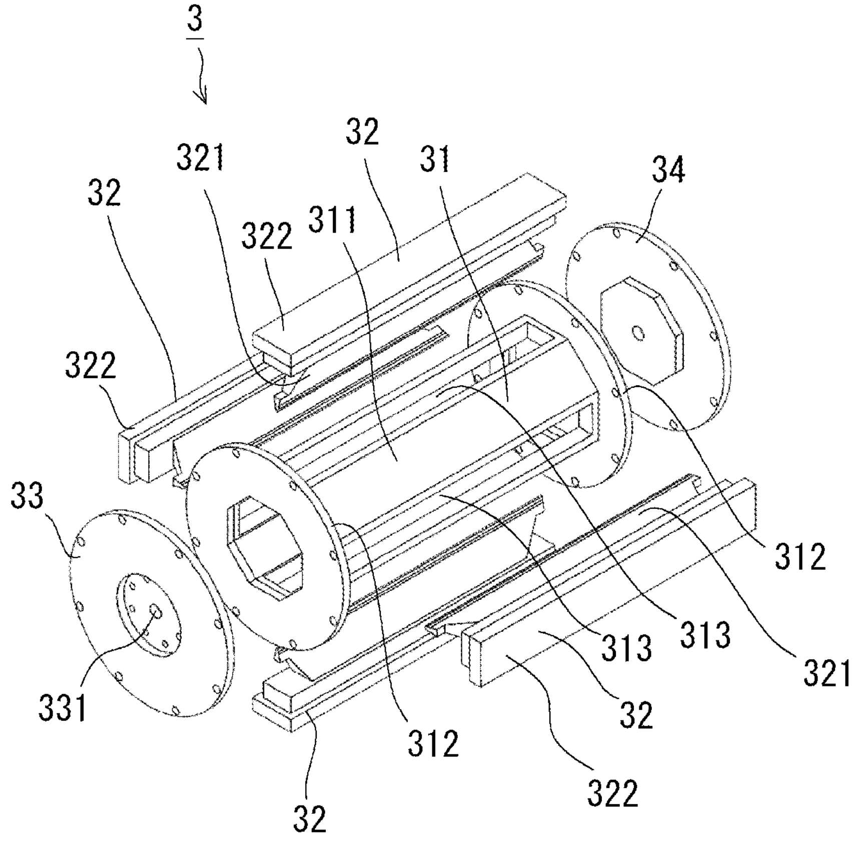
FIG. 3 is an exploded perspective view illustrating the configuration of the radio frequency quadrupole linear accelerator according to the present embodiment.

FIG. 2 is a perspective view illustrating the configuration of the radio frequency quadrupole linear accelerator according to the present embodiment. FIG. 3 is an exploded perspective view illustrating the configuration of the radio frequency quadrupole linear accelerator according to the present embodiment. The radio frequency quadrupole linear accelerator 3 according to the present embodiment includes a tubular housing part 31, four first vane electrodes 32, and front and rear end plates 33 and 34.

The tubular housing part 31 includes a substantially cylindrical tubular part 311, and annular flange parts 312 connected to front and rear ends of the tubular part 311, respectively. The tubular part 311 and the flange parts 312 are integrally formed.

The tubular part 311 has an outer peripheral surface at which two pairs of openings 313 extending in an axial direction are formed facing each other at a phase difference of 90°. Each openings 313 is formed in a substantially rectangular shape. The tubular housing part 31 is made of a base material that is, for example, iron with high stiffness. For example, highly electrically conductive copper plating is provided inside an acceleration cavity of the tubular housing part 31. Note that the tubular housing part 31 may be formed by machining oxygen-free copper. The inside of the tubular housing part 31 is made vacuum. The outer peripheral surface of the tubular part 311 may be provided with a vacuum port, a coupler port, a pickup port, or the like.

The first vane electrodes 32 are inserted into the openings 313 of the tubular housing part 31 from the outside toward an axial center. Each first vane electrode 32 is constituted by an electrode part 321 and a fitting part 322, the electrode part 321 being formed on a distal end side and having a substantially triangular section, the fitting part 322 being formed on a rear end side and fitted to an opening 313 of the tubular housing part 31. The electrode part 321 and the fitting part 322 are integrally formed. The fitting part 322 of each first vane electrode 32 is fitted to an opening 313 of the tubular housing part 31 and detachably attached to the opening 313 by a bolt or the like. The first vane electrodes 32 of each pair are disposed facing each other.

A distal end part of the electrode part 321 of each first vane electrode 32 is formed in a wave shape in a longitudinal direction. Note that, in FIG. 3, the wave shape of the distal end part of the electrode part 321 of each first vane electrode 32 is simplified. The first vane electrodes 32 are disposed facing each other in a direction orthogonal to a beam acceleration axis. Moreover, the facing first vane electrodes 32 are disposed such that their mountains face each other and their valleys face each other, and the adjacent first vane electrodes 32 separated from each other by 90° are disposed such that their mountains are adjacent to their valleys.

Among the four first vane electrodes 32, the facing first vane electrodes 32 of one of the pairs and the facing first vane electrodes 32 of the other pair are provided with radio frequency electric power in different signs. The tubular housing part 31 and the first vane electrodes 32 form a radio frequency cavity resonator. Radio frequency voltage is produced at the first vane electrodes 32 when radio frequency electric power at a frequency equal to the resonance frequency of the resonator is supplied to the tubular housing part 31 and the first vane electrodes 32.

Then, when an ion beam is incident on a central part surrounded by the first vane electrodes 32, the ion beam is focused and accelerated by a radio frequency quadrupole electric field and emitted from the tubular housing part 31 as a high energy ion beam.

A front end plate 33 is provided at a front end of the tubular housing part 31 to block the front end of the tubular housing part 31. The front end plate 33 is detachably provided at the front end of the tubular housing part 31 by a bolt or the like. The front end plate 33 is a plate member in a substantially circular shape and formed with a through-hole 331 at a central part. The ion beam accelerated by the above-described radio frequency quadrupole electric field in the tubular housing part 31 is emitted from the through-hole 331 of the front end plate 33.

A rear end plate 34 is provided at a rear end of the tubular housing part 31 to block the rear end of the tubular housing part 31. The rear end plate 34 is detachably provided at the rear end of the tubular housing part 31 by a bolt or the like. The rear end plate 34 is a plate member in a substantially circular shape and formed with a through-hole at a central part.

At least one of the front end plate 33 and the rear end plate 34 may be formed integrally with the tubular housing part 31. Note that, since the front and rear end plates 33 and 34 are detachably provided as separate bodies at the front and rear ends of the tubular housing part 31 as described above, connectivity of other members to the front and rear ends of the tubular housing part 31 is excellent.

A first vane electrode needs to be replaced when part of the first vane electrode is radioactivated or damaged, but the first vane electrode is shaped integrally with a tubular housing part in a conventional radio frequency quadrupole linear accelerator. Thus, the first vane electrode as well as the tubular housing part are simultaneously replaced, which needs work and lowers maintainability.

However, in the radio frequency quadrupole linear accelerator 3 according to the present embodiment, as described above, the first vane electrodes 32 are inserted into the respective openings 313 of the tubular housing part 31 from the outside toward the axial center, detachably attached to the openings 313, and disposed facing each other.

Accordingly, for example, when part or the entire of each first vane electrode 32 is radioactivated or damaged and the first vane electrode 32 needs to be replaced, only the radioactivated or damaged first vane electrode 32 can be easily removed from the opening 313 of the tubular housing part 31 and a new first vane electrode 32 can be attached.

Each first vane electrode 32 is inserted into an opening 313 of the tubular housing part 31 from the outside toward the axial center. Accordingly, a first vane electrode 32 that needs to be replaced can be easily accessed from the outside and removed and a new first vane electrodes 32 can be attached. Thus, maintainability of the radio frequency quadrupole linear accelerator 3 can be improved.

The front and rear end plates 33 and 34 may be detachably provided at the front and rear ends of the tubular housing part 31, respectively, as described above. Accordingly, for example, when the front or rear end plate 33 or 34 is radioactivated or damaged and needs to be replaced, only the radioactivated or damaged front or rear end plate 33 or 34 can be easily removed from the tubular housing part 31 and a new front or rear end plate 33 or 34 can be attached. Thus, maintainability of the radio frequency quadrupole linear accelerator 3 can be further improved.

A radio frequency quadrupole linear accelerator manufacturing method according to the present embodiment will be described below.

First, the tubular housing part 31, the four first vane electrodes 32, and the front and rear end plates 33 and 34 are each manufactured. The tubular housing part 31 is manufactured by, for example, machining a parent material such as iron with a working machine and plating its surface with copper.

Subsequently, the first vane electrodes 32 are inserts into the respective openings 313 of the tubular housing part 31 from the outside toward the axial center, fitted to the openings 313, and disposed facing each other. Then, the first vane electrodes 32 are coupled and fixed to the respective openings 313 of the tubular housing part 31 by bolts or the like.

The front and rear end plates 33 and 34 are coupled to the front and rear ends of the tubular housing part 31 by bolts or the like. Note that the front and rear end plates 33 and 34 may be coupled to the tubular housing part 31 earlier than the first vane electrodes 32.

As described above, the radio frequency quadrupole linear accelerator 3 according to the present embodiment includes the tubular housing part 31 having an outer peripheral surface at which the two pairs of openings 313 extending in the axial direction are formed facing each other, and the plurality of first vane electrodes 32 inserted into the respective openings 313 of the tubular housing part 31 from the outside toward the axial center, detachably fitted to the openings 313, and disposed facing each other.

Accordingly, only a first vane electrode 32 that needs to be replaced can be easily removed from the opening 313 of the tubular housing part 31 and a new first vane electrode 32 can be attached. Moreover, a first vane electrodes 32 that needs to be replaced can be easily accessed from the outside and removed and a new first vane electrode 32 can be attached. Thus, maintainability of the radio frequency quadrupole linear accelerator 3 can be improved.

Conventionally, problems have occurred that (1) distortion occurs at brazing as the temperature of an acceleration cavity body increases, (2) junction defect occurs under an inappropriate brazing condition and repair potentially becomes difficult, and (3) the acceleration cavity body needs to be divided in a longitudinal direction in accordance with the size of a vacuum brazing furnace.

However, since each component material is coupled by a screw such as a bolt as described above in the radio frequency quadrupole linear accelerator 3 according to the present embodiment, the above-described problems (1) to (3) do not occur.

Furthermore, conventionally, problems have occurred that (4) a large parent material of several meters is used to manufacture an integrated object and a large-sized working machine is needed to process the parent material, which leads to high manufacture cost, (5) when an electrode near a beam axis is damage by charged particles, radiation, or the like, it is impossible to replace only the damaged electrode due to structure and the entire acceleration cavity needs to be replaced, and (6) the overall length of the acceleration cavity body is restricted by the size of a working machine.

However, in the radio frequency quadrupole linear accelerator 3 according to the present embodiment, the above-described problems (4) to (6) do not occur as described above.

For the radio frequency quadrupole linear accelerator 3 according to the present embodiment, (1) a main manufacturing processes is only machining and assembling by bolt fastening, and thus manufacture cost can be lowered and it is easily possible to provide the overall length of the acceleration cavity body and the interval of division in the longitudinal direction without restriction, and (2) it is easy to disassemble and assemble again the acceleration cavity body, which leads to high maintainability.

For example,

- Processing (machining and polishing) on internal electrodes (vanes) for frequency adjustment is easy and thus later adjustment is easy. Electric field distribution adjustment that achieves high efficiency acceleration is possible.
- Cooling functions (such as attachment to a flange) for incident and emission parts for which cooling is particularly needed can be installed later.
- As for a parent material, for example, a copper parent material to be machined or an iron parent material to be subjected to copper plating can be freely chosen as necessary.
- Correction processing is simple for bolt fastening according to the present embodiment, and thus an acceleration cavity with a short inter-vane distance can be easily adjusted, which makes it easy to manufacture a radio frequency quadrupole linear accelerator at a high frequency of 300 MMHz or higher. This has an advantage in applicability as described above because of frequent usage for proton acceleration.

Second Embodiment

Figure 4:
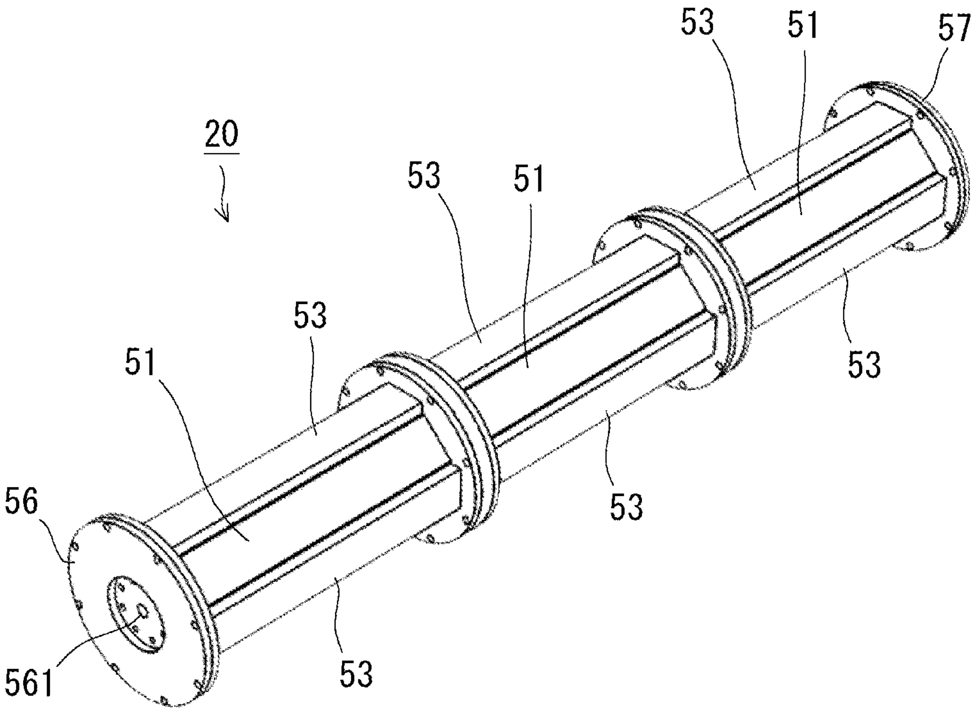
FIG. 4 is a perspective view illustrating the configuration of the radio frequency quadrupole linear accelerator according to the present embodiment.
Figure 5:
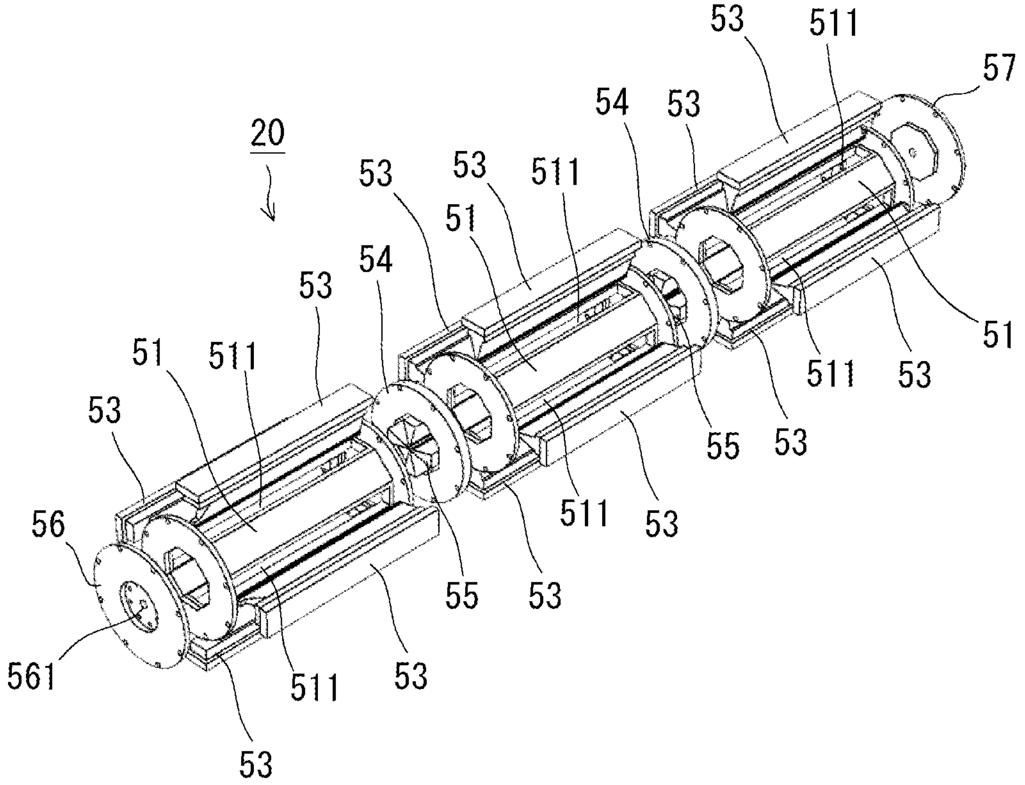
FIG. 5 is an exploded perspective view illustrating the configuration of the radio frequency quadrupole linear accelerator according to the present embodiment.

FIG. 4 is a perspective view illustrating the configuration of a radio frequency quadrupole linear accelerator according to the present embodiment. FIG. 5 is an exploded perspective view illustrating the configuration of the radio frequency quadrupole linear accelerator according to the present embodiment.

In the present embodiment, the above-described tubular housing part may be constituted by coaxially coupling a plurality of tubular members 51. For example, as illustrated in FIG. 4, the above-described tubular housing part may be constituted by coaxially coupling three tubular member 51. As illustrated in FIG. 5, the tubular member 51 has an outer peripheral surface at which two pairs of openings 511 extending in an axial direction are formed facing each other at a phase difference of 90°.

First vane electrodes 53 are inserted into the respective openings 511 of the tubular member 51 from outside toward an axial center, detachably fitted to the openings 511, and disposed facing each other.

Figure 6:
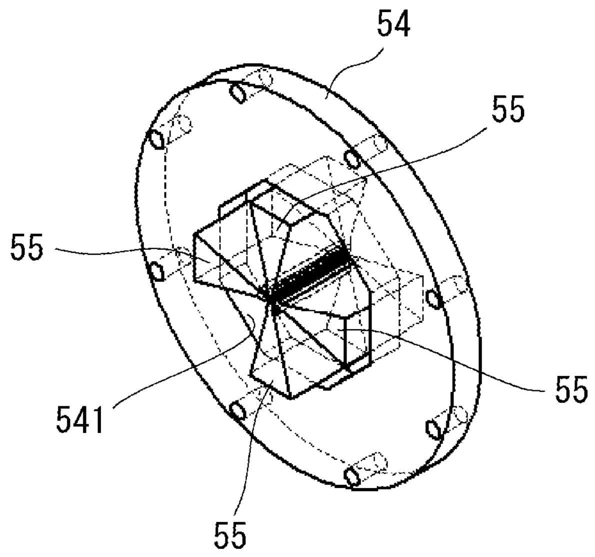
FIG. 6 is a perspective view illustrating the configuration of a connection flange connecting tubular members.

FIG. 6 is a perspective view illustrating the configuration of a connection flange connecting the tubular members. The tubular members 51 are coaxially coupled to one another through a connection flange 54. The connection flange 54 is a substantially annular plate member formed with a through-hole 541 at a central part. Each tubular member 51 is coupled to the connection flange 54 by a bolt or the like.

The through-hole 541 is formed with a section in a substantially octagonal shape, for example. In the through-hole 541 of the connection flange 54, two pairs of second vane electrodes 55 facing each other are provided at a phase difference of 90°. Each second vane electrode 55 is detachably coupled in the through-hole 541 of the connection flange 54 by a bolt or the like. Note that the connection flange 54 and the second vane electrodes 55 may be integrally shaped. Each second vane electrode 55 is disposed between the first vane electrodes 53 adjacent to each other and connects the first vane electrodes 53 at respective ends. Accordingly, each second vane electrode 55 and the first vane electrodes 53 at respective ends are continuously connected to each other in the axial direction.

The tubular members 51, the connection flange 54, the first vane electrodes 53, and the second vane electrodes 55 form a radio frequency cavity resonator, and radio frequency voltage is produced at the first and second vane electrodes 53 and 55.

An ion beam is incident on a central part surrounded by the first and second vane electrodes 53 and 55, and the ion beam is focused and accelerated by a radio frequency quadrupole electric field and emitted as a high energy ion beam.

A front end plate 56 is provided at a front end of a tubular member 51 on the front side to block the front end of the tubular member 51 on the front side. The front end plate 56 is detachably provided at the front end of the tubular member 51 on the front side by a bolt or the like. An ion beam accelerated by a radio frequency quadrupole electric field in the tubular member 51 is emitted from a through-hole 561 of the front end plate 56.

A rear end plate 57 is provided at a rear end of a tubular member 51 on the back side to block the rear end of the tubular member 51 on the back side. The rear end plate 57 is detachably provided at the rear end of the tubular member 51 on the back side by a bolt or the like.

In a radio frequency quadrupole linear accelerator 20 according to the present embodiment, the tubular housing part is constituted by coupling the plurality of tubular members 51. Accordingly, the individual tubular members 51 can be downsized, and a processing machine or the like that manufactures each tubular member 51 can be downsized. Thus, manufacturing cost can be reduced.

For example, the tubular housing part has an overall length of 2 to 3 m approximately and a large-sized processing machine is needed to machine the tubular housing part out of a large-sized parent material. However, in a case where the tubular housing part is constituted by three tubular members 51, each tubular member 31 has an overall length up to 1 m approximately and can be machined by a small-sized processing machine. Thus, each tubular member 31 can be manufactured at low cost by using a small-sized processing machine. Note that the overall length of the tubular housing part may be short, for example, 30 cm, 50 cm approximately.

When some of the plurality of tubular members 51 constituting the tubular housing part are radioactivated or damaged, only the radioactivated or damaged tubular members 51 can be easily removed and new tubular members 51 can be attached. Similarly, when some of the plurality of first and second vane electrodes 53 and 55 are radioactivated or damaged, only the radioactivated or damaged first and second vane electrodes 53 and 55 can be easily removed and new first and second vane electrodes 53 and 55 can be attached. In this manner, only radioactivated or damaged parts can be replaced in a partial manner and maintainability of the radio frequency quadrupole linear accelerator 20 can be improved.

In the above-described embodiment, the tubular housing part is constituted by coaxially coupling the three tubular members 51 but is not limited thereto. The number of coupled tubular members 51 may be, for example, two or four or more and is optional. For example, the overall length of each tubular member 51 may be determined in accordance with the size of an existing processing machine, and the number of tubular members 51 may be determined corresponding to the overall length.

All members including the tubular housing part may be produced by, for example, plating a metal parent material with highly electrically conductive copper or machining oxygen-free copper.

The embodiments of the present invention are described above but the embodiments are presented as examples and not intended to limit the scope of the invention. These novel embodiments may be performed in other various forms and provided with various kinds of omission, replacement, and change without departing from the gist of the invention. The embodiments and any modification are included in the scope and gist of the invention and also included in the invention written in the claims and equivalents of the invention.

The present application is based upon and claims the benefit of priority from Japanese Patent Application No. 2021-160864, filed on Sep. 30, 2021, the entire contents of which are incorporated herein by reference.

REFERENCE SIGNS LIST

1 neutron source system
2 ion source
3 radio frequency quadrupole linear accelerator
4 target station
20 radio frequency quadrupole linear accelerator
31 tubular housing part
32 first vane electrode
33 front end plate
34 rear end plate
51 tubular member
53 first vane electrode
54 connection flange
55 second vane electrode
56 front end plate
57 rear end plate
311 tubular part
312 flange part
313 opening
321 electrode part
322 fitting part
511 opening
541 through-hole

The invention claimed is:

1. A radio frequency quadrupole linear accelerator comprising:

a tubular housing part having an outer peripheral surface at which two pairs of openings extending in an axial direction are formed facing each other; and a plurality of first vane electrodes inserted into the respective openings of the tubular housing part from outside toward an axial center, detachably attached to the openings, and disposed facing each other.

2. The radio frequency quadrupole linear accelerator according to claim 1, wherein the tubular housing part is constituted by coaxially coupling a plurality of tubular members each having an outer peripheral surface at which two pairs of openings extending in an axial direction are formed facing each other, and the first vane electrodes are inserted into the respective openings of the tubular members from outside toward an axial center, detachably attached to the openings, and disposed facing each other.

3. The radio frequency quadrupole linear accelerator according to claim 2, wherein the tubular members are coaxially coupled to one another through a connection flange formed with a through-hole at a central part, two pairs of second vane electrodes facing each other are detachably provided in the through-hole of the connection flange, and each of the second vane electrodes is disposed between the first vane electrodes adjacent to each other and connects the first vane electrodes.

4. The radio frequency quadrupole linear accelerator according to claim 2, wherein a front end plate formed with a through-hole at a central part is detachably provided at a front end of the tubular housing part to block the front end, and a rear end plate formed with a through-hole at a central part is detachably provided at a rear end of the tubular member to block the rear end.

5. A neutron source system comprising:

an ion source configured to generate ions;

the radio frequency quadrupole linear accelerator according to claim 1, the radio frequency quadrupole linear accelerator being configured to accelerate the ions generated by the ion source; and a target station including a neutron production target material inside and configured to produce neutrons through nuclear reaction as the ions accelerated by the radio frequency quadrupole linear accelerator collide with the neutron production target material.

6. A radio frequency quadrupole linear accelerator manufacturing method comprising:

a step of forming a tubular housing part having an outer peripheral surface at which two pairs of openings extending in an axial direction are formed facing each other; and a step of inserting first vane electrodes into the respective openings of the tubular housing part from outside toward an axial center, detachably attaching the first vane electrodes to the openings, and disposing the first vane electrodes such that the first vane electrodes face each other.

7. The radio frequency quadrupole linear accelerator manufacturing method according to claim 6, wherein a plurality of tubular members each having an outer peripheral surface at which two pairs of openings extending in an axial direction are formed facing each other are formed and coaxially coupled to constitute the tubular housing part, and the first vane electrodes are inserted into the respective openings of the tubular members from outside toward an axial center, detachably attached to the openings, and disposed facing each other.

* * * * *